US011270207B2

United States Patent
Chiu et al.

(10) Patent No.: US 11,270,207 B2
(45) Date of Patent: Mar. 8, 2022

(54) ELECTRONIC APPARATUS AND COMPRESSION METHOD FOR ARTIFICIAL NEURAL NETWORK

(71) Applicant: National Tsing Hua University, Hsinchu (TW)

(72) Inventors: Chih-Yao Chiu, Hsinchu (TW); Tyng-Luh Liu, Hsinchu (TW); Hwann-Tzong Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 575 days.

(21) Appl. No.: 16/253,229

(22) Filed: Jan. 22, 2019

(65) Prior Publication Data

US 2020/0082268 A1 Mar. 12, 2020

(30) Foreign Application Priority Data

Sep. 11, 2018 (TW) .................................. 107131887

(51) Int. Cl.
*G06N 3/08* (2006.01)
*G06N 3/04* (2006.01)

(52) U.S. Cl.
CPC ............ *G06N 3/082* (2013.01); *G06N 3/0454* (2013.01); *G06N 3/0481* (2013.01)

(58) Field of Classification Search
CPC ...... G06N 3/082; G06N 3/0454; G06N 3/0481
(Continued)

(56) References Cited

U.S. PATENT DOCUMENTS 7,440,928 B2 * 10/2008 Ransing .................. G16Z 99/00
706/14
2017/0083792 A1 * 3/2017 Rodriguez-Serrano .......................
G06T 7/10
(Continued)

FOREIGN PATENT DOCUMENTS

CN 106355248 1/2017
CN 107368891 11/2017
(Continued)

OTHER PUBLICATIONS

Lee, et al., "Structure Level Adaptation for Artificial Neural Networks", Springer Science + Business Media LLC, 1991 (Year: 1991).*
He, et al., "Channel Pruning for Accelerating Very Deep Neural Networks", Proceedings of the IEEE International Conference on Computer Vision (ICCV), 2017, pp. 1389-1397 (Year: 2017).*
(Continued)

*Primary Examiner* — Tsu-Chang Lee
(74) *Attorney, Agent, or Firm* — JCIPRNET

(57) ABSTRACT

An electronic apparatus and a compression method for an artificial neural network are provided. The compression method is adapted for the artificial neural network with a plurality of convolution layers. The compression method includes: setting a first pruning layer for coupling the first pruning layer to Lth convolution layer, where the first pruning layer has a plurality of first weighting values and each of the first weighting values corresponds to each of a plurality of channels of the Lth convolution layer; tuning the first weighting values, selecting a part of the channels of the Lth convolution layer to be at least one first redundancy channel according to the first weighting values, and generating a compressed Lth convolution layer by deleting the at least one first redundancy channel; and removing the first
(Continued)

pruning layer, and generating a first compressed artificial neural network.

9 Claims, 6 Drawing Sheets

(58) Field of Classification Search
USPC .......................................................... 706/15
See application file for complete search history.

(56) References Cited

U.S. PATENT DOCUMENTS

| | | | |
|---|---|---|---|
| 2018/0082181 A1 | 3/2018 | Brothers et al. | |
| 2019/0278014 A1* | 9/2019 | Zhan | G02B 6/0036 |
| 2019/0286944 A1* | 9/2019 | Thorpe | G06K 9/00718 |

FOREIGN PATENT DOCUMENTS

| | | |
|---|---|---|
| CN | 107832837 | 3/2018 |
| TW | 200740196 | 10/2007 |
| TW | 201105143 | 2/2011 |
| TW | 201427425 | 7/2014 |
| WO | 2018000309 | 1/2018 |

OTHER PUBLICATIONS

"Office Action of Taiwan Counterpart Application", dated Nov. 13, 2019, p. 1-p. 3.

Ratko Pilipovi et al., "Compression of convolutional neural networks," 2018 17th International Symposium Infotech-Jahoria, Mar. 21-23, 2018, pp. 1-6.

Vivienne Sze et al., "Efficient Processing of Deep Neural Networks: A Tutorial and Survey," Proceedings of the IEEE, vol. 105, No. 12, Dec. 2017, pp. 2295-2329.

Zhuang Liu et al., "Learning Efficient Convolutional Networks through Network Slimming ," 2017 IEEE International Conference on Computer Vision, Oct. 22-29, 2017, pp. 1-10.

Qiangui Huang et al., "Learning to Prune Filters in Convolutional Neural Networks," 2018 IEEE Winter Conference on Applications of Computer Vision, Mar. 12-15, 2018, pp. 1-10.

Hao Li et al., "Pruning Filiters for Efficient ConvNets," Published as a conference paper at ICLR 2017, Mar. 10, 2017, pp. 1-13.

* cited by examiner

ELECTRONIC APPARATUS AND COMPRESSION METHOD FOR ARTIFICIAL NEURAL NETWORK

CROSS-REFERENCE TO RELATED APPLICATION

This application claims the priority benefit of Taiwan application serial no. 107131887, filed on Sep. 11, 2018. The entirety of the above-mentioned patent application is hereby incorporated by reference herein and made a part of this specification.

BACKGROUND OF THE INVENTION

1. Field of the Invention

The invention relates to an electronic apparatus and a compression method for an artificial neural network, and more particularly, to a compression method capable of reducing computational complexity for the artificial neural network.

2. Description of Related Art

With the advancement of artificial intelligence technology, deep artificial neural networks have become an important technology. Through a depth artificial neural network model obtained after training a deep learning algorithm, many visual-related application problems can be solved. However, the deep artificial neural networks usually involve high computational complexity and require high data storage space. Therefore, how to reduce computational complexity for the deep artificial neural networks has become an important issue for designers in the field.

SUMMARY OF THE INVENTION

The invention provides an electronic apparatus and a compression method for an artificial neural network, which are capable of effectively reducing computational complexity and data storage space.

The compression method for the artificial neural network of the invention is adapted for the artificial neural network with a plurality of convolution layers. The compression method includes: setting a first pruning layer for coupling the first pruning layer to a Lth convolution layer among the convolution layers, wherein the first pruning layer has a plurality of first weighting values, and the first weighting values respectively correspond to a plurality of channels of the Lth convolution layer, wherein L is a positive integer; tuning the first weighting values, selecting a part of the channels of the Lth convolution layer to be at least one first redundancy channel according to the first weighting values, and generating a compressed Lth convolution layer by deleting the at least one first redundancy channel; and removing the first pruning layer, and generating a first compressed artificial neural network.

In an embodiment of the invention, the compression method further includes: calculating a moving average of a training error rate; comparing the moving average with a first threshold; and activating a restoring procedure when the moving average is greater than the threshold.

In an embodiment of the invention, the compression method further includes: setting a second pruning layer for coupling the second pruning layer to an (L+1)th convolution layer among the convolution layers, wherein the second pruning layer has a plurality of second weighting values, and each of the second weighting values corresponds to each of a plurality of channels of the (L+1)th convolution layer; tuning the second weighting values, selecting a part of the channels of the (L+1)th convolution layer to be at least one second redundancy channel according to the second weighting values, and generating a compressed (L+1)th convolution layer by deleting the at least one second redundancy channel; and removing the second pruning layer, and generating a second compressed artificial neural network.

The electronic apparatus of the invention is configured to execute an algorithm for an artificial neural network with a plurality of convolution layers. The electronic apparatus includes a controller, and the controller is configured for: setting a first pruning layer for coupling the first pruning layer to a Lth convolution layer among the convolution layers, wherein the first pruning layer has a plurality of first weighting values, and the first weighting values respectively correspond to a plurality of channels of the Lth convolution layer, wherein L is a positive integer; tuning the first weighting values, selecting a part of the channels of the Lth convolution layer to be at least one first redundancy channel according to the first weighting values, and generating a compressed Lth convolution layer by deleting the at least one first redundancy channel; and removing the first pruning layer, and generating a first compressed artificial neural network.

Based on the above, by providing the pruning layer as described in the invention, a pruning action may be executed for the channels of the convolution layer in the artificial neural network by using the weighting values in the pruning layer. In this way, the number of channels in the convolution layer may be effectively reduced while taking into account the error rate, and computational complexity and data storage space may also be reduced to improve the working efficiency of the system.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
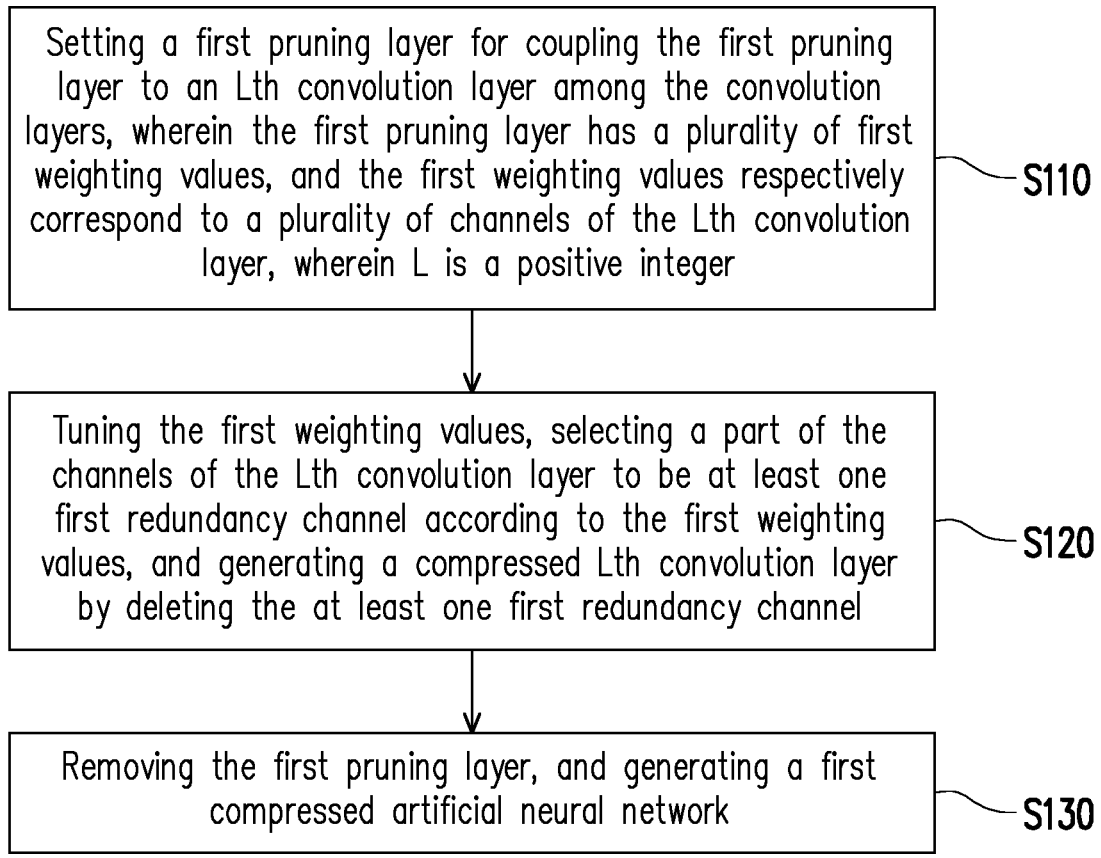
FIG. 1 is a flowchart illustrating a compression method for an artificial neural network according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
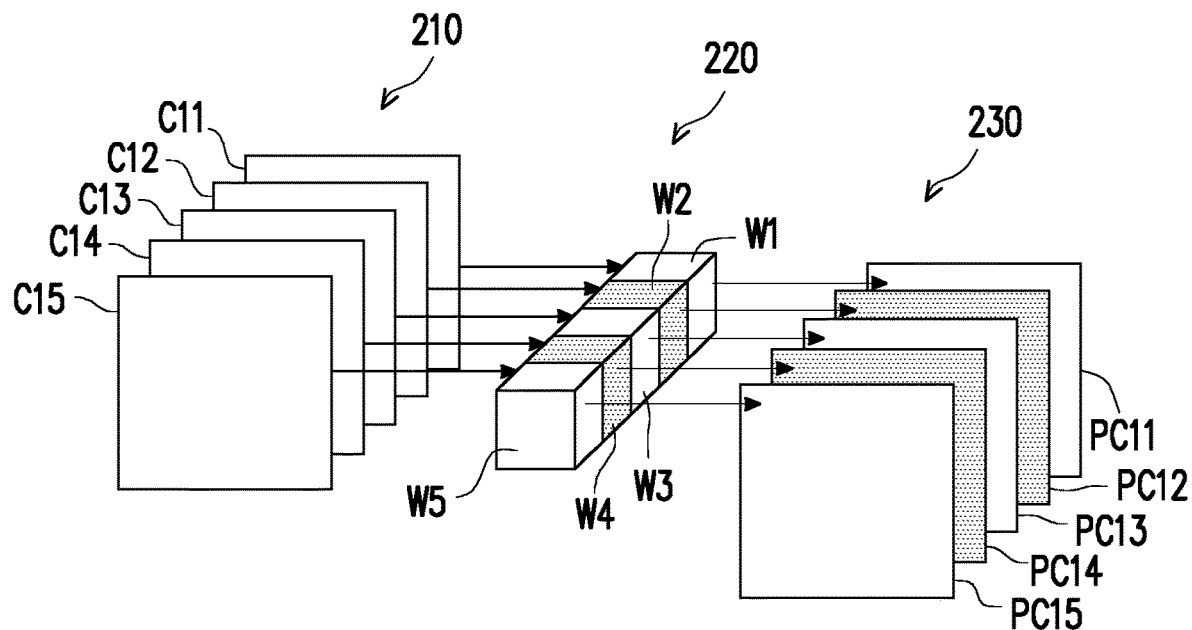
FIG. 2A to FIG. 2C are schematic diagrams illustrating a compression action for the artificial neural network according to an embodiment of the invention.
Figure 2B:
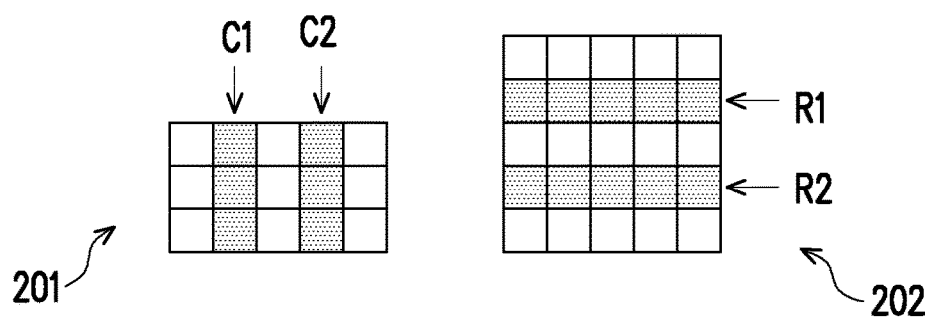
Figure 2C:
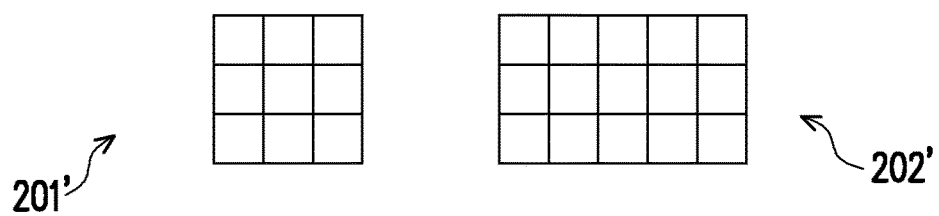

With reference to FIG. 1, FIG. 1 is a flowchart illustrating a compression method for an artificial neural network according to an embodiment of the invention. In FIG. 1, a first pruning layer is set for coupling the first pruning layer to a Lth convolution layer among convolution layers in step S110. The first pruning layer has a plurality of weighting values, and the weighting values respectively correspond to a plurality of channels in the Lth convolution layer, where L is a positive integer. Referring to FIG. 1 and FIG. 2A to FIG. 2C together, FIG. 2A to FIG. 2C are schematic diagrams illustrating a compression action for the artificial neural network according to an embodiment of the invention. Here, a Lth convolution layer 210 of the artificial neural network has a plurality of channels C11 to C15. In step S110, a pruning layer 220 is set next to the Lth convolution layer 210, and the pruning layer 220 has a plurality of weighting values W1 to W5 corresponding to the channels C11 to C15.

Next, in step S120, the weighting values W1 to W5 are tuned, one or more of the channels C11 to C15 in the Lth convolution layer 210 are selected according to the weighting values W1 to W5 to be redundancy channel(s), and a compressed Lth convolution layer 230 is generated by deleting the redundancy channel(s). In this embodiment of the invention, the weighting values W1 to W5 may be tuned such that the weighting values W1 to W5 become binary values 1, 0, 1, 0 and 1, respectively. Among the weighting values W1 to W5, the channels C12 and C14 corresponding to the weighting values W2 and W4 being 0 are selected to be the redundancy channels. In step S120, the compressed Lth convolution layer 230 is generated by deleting the channels C12 and C14 (which are the redundancy channels). Channels PC11, PC13 and PC15 in the compressed Lth convolution layer 230 are maintained in normal operation, whereas channels PC12 and PC14 are deleted without being added to the operation.

In FIG. 2B, the Lth convolution layer 210 may be arranged in a form of an array 201 or an array 202. Take the array 201 as an example, the redundancy channels may be a plurality of columns C1 and C2 of the array 201. As for the array 202, the redundancy channels may be a plurality of rows R1 and R2 of the array 202. After the redundancy channels are deleted, the compressed Lth convolution layer 230 may be obtained, as shown by an array 201' or an array 202' in FIG. 2C.

Referring back to FIG. 1, after step S120, the pruning layer 220 is removed and the compressed artificial neural network is obtained in step S130.

It should be noted that, after the compressed Lth convolution layer 230 is generated, the compression action may be performed for an (L+1)th convolution layer according to the embodiment of the invention. The compression action performed for the (L+1)th convolution layer is similar to the compression action performed for the Lth convolution layer. That is to say, actions described in steps S110 to S130 may be re-executed for the (L+1)th convolution layer to generate a new compressed artificial neural network.

It is not difficult to know from the foregoing embodiments that the compression method for the artificial neural network according to the embodiment of the invention may be used to delete the redundant channels from the artificial neural network on a layer-by-layer basis and obtain the compressed artificial neural network, so as to effectively reduce computational complexity for the artificial neural network.

Figure 3:
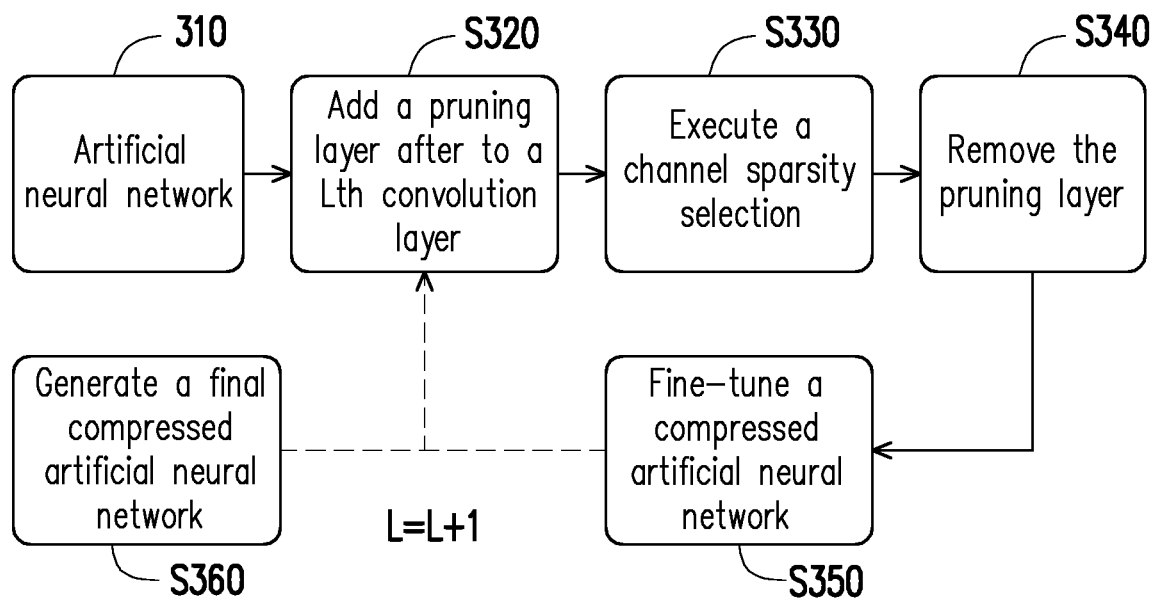
FIG. 3 is a flowchart illustrating actions in the compression method for the artificial neural network according to an embodiment of the invention.

With reference to FIG. 3, FIG. 3 is a flowchart illustrating actions in the compression method for the artificial neural network according to an embodiment of the invention. In FIG. 3, an artificial neural network 310 is received for compression. In step S320, a pruning layer is added after a Lth convolution layer, where the pruning layer has a plurality of weighting values. Next, a channel sparsity selection is executed according to the pruning layer in step S330, and the pruning layer is removed in step S340. In step S350, L is increased by 1 after an optimization action to fine-tune a compressed artificial neural network, and step S320 is re-executed so the compression action can be performed on the next convolution layer. After the compression action is performed for all the convolution layers to be compressed, a final compressed artificial neural network may be obtained (step S360).

With regard to implementation details of the channel sparsity selection executed in step S330, the channel sparsity selection may be executed by tuning the weighting values in the pruning layer according to the embodiment of the invention. Action for tuning the weighting values may be divided into two phases. The first phase is to fix a plurality of variable values in the artificial neural network, and initialize the weighting values in the pruning layer to be set to real numbers such that each of the weighting values is greater than or equal to 0 and less than or equal to 1. Next, a target function is created according to an error function and an absolute value of each of the first weighting values. Here, the error function is used to calculate a difference between an actual output value and a predicted output value of the Lth convolution layer.

In this embodiment, the target function $\mathcal{L}_{all} = \mathcal{L}(Y,Y1) + \lambda_1 \cdot \|P\|_1$, in which $\mathcal{L}(Y,Y1)$ is the error function, Y is the actual output value, Y1 is the predicted output value, $\|P\|_1$ is a norm of each of the first weighting values, and $\lambda_1$ is a constant.

Tuned weighting values may be generated through a training procedure under the premise that the value of the target function $\mathcal{L}_{all}$ is minimized.

In another embodiment of the invention, the target function may also be created further according to a difference between 1 and each of the weighting values, and to each of the weighting values. In this case, the target function may be set to Target function $\mathcal{L}_{all} = \mathcal{L}(Y,Y1) + \lambda_1 \cdot \|P\|_1 + \lambda_2 \cdot \|P \odot (1-P)\|_1$ in which $\odot$ is a multiplication operator. Here, $\|P \odot (1-P)\|_1$ is a binarization expression to produce a binarizing trend for the calculated weighting values, and to increase the probability that the weight value is equal to 0 or 1.

In the second phase, the variable values in the artificial neural network are changed and the calculated weighting values from the first phase are fixed. Further, the calculated weighting values from the first phase are compared with a reference value to generate a plurality of comparison results, respectively. Next, the weighting values are respectively tuned to be a plurality of binarized weighting values equal to 1 or 0 according to the comparison results.

More specifically, the reference value may be 0.5. In the second phase, each of the weighting values is compared with 0.5. The weighting value is changed to be equal to 1 when that weighting value is greater than 0.5, and the weighting value is changed to be equal to 0 when that weighting value is not greater than 0.5.

Through a non-synchronous or synchronous execution of the first phase and the second phase, the pruning layer having the binarized weighting values can be calculated. Then, by executing the channel sparsity selection action in step S330 through the calculated pruning layer, the compression action may be completed for the Lth convolution layer.

Figure 4:
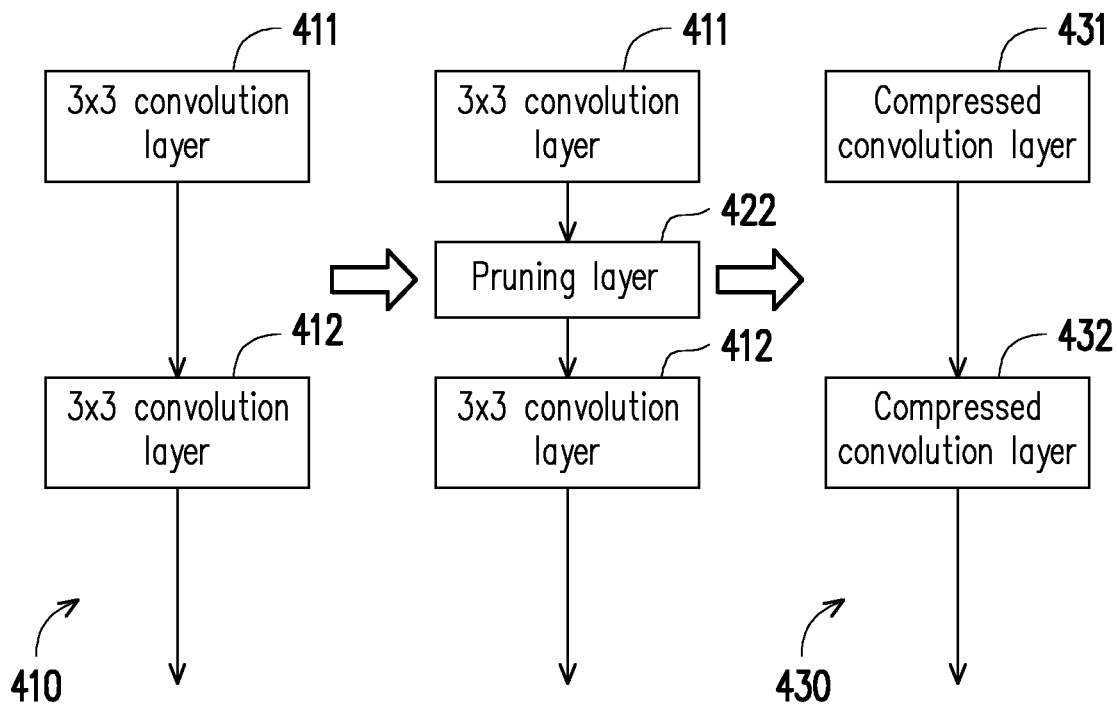
FIG. 4 is a schematic diagram illustrating a compression action for the artificial neural network according to an embodiment of the invention.

In FIG. 4, which is the schematic diagram illustrating the compression action for the artificial neural network according to an embodiment of the invention, an artificial neural network 410 includes a plurality of 3×3 convolution layers 411 and 412 in 3×3 dimension. By adding a pruning layer 422 after the 3×3 convolution layer 411 and calculating the weighting values as described in the embodiment of FIG. 3, the pruning layer 422 can execute the channel sparsity action for the 3×3 convolution layer 411 and generate a compressed convolution layer 431. Similarly, the channel sparsity action may be executed for the 3×3 convolution layer 412 through another pruning layer to generate a compressed convolution layer 432. In this way, a compressed artificial neural network 430 may be obtained.

With regard to the channel sparsity action described above, in the embodiment of the invention, the redundancy channels have a chance to be rebuilt. Here, in the embodiment of the invention, a moving average of a training error rate may be calculated. The moving average of the training error rate $E_{ema}=(1-\alpha) \cdot E_{ema}+\alpha \cdot E(Y, Y2)$, in which E(Y, Y2) is an error rate between the actual output value Y and a predicted output value Y2, and $\alpha$ is a constant greater than 0 and less than 1. Further, by comparing the moving average of the training error rate $E_{ema}$ with a threshold and activating a restoring procedure when the moving average of the training error rate $E_{ema}$ is greater than the threshold, the deleted channels may be restored.

The action of activating the restoring procedure may be done simply by changing $\lambda_1$ in the equation of the target function in the first stage from a positive value to a negative value.

Figure 5:
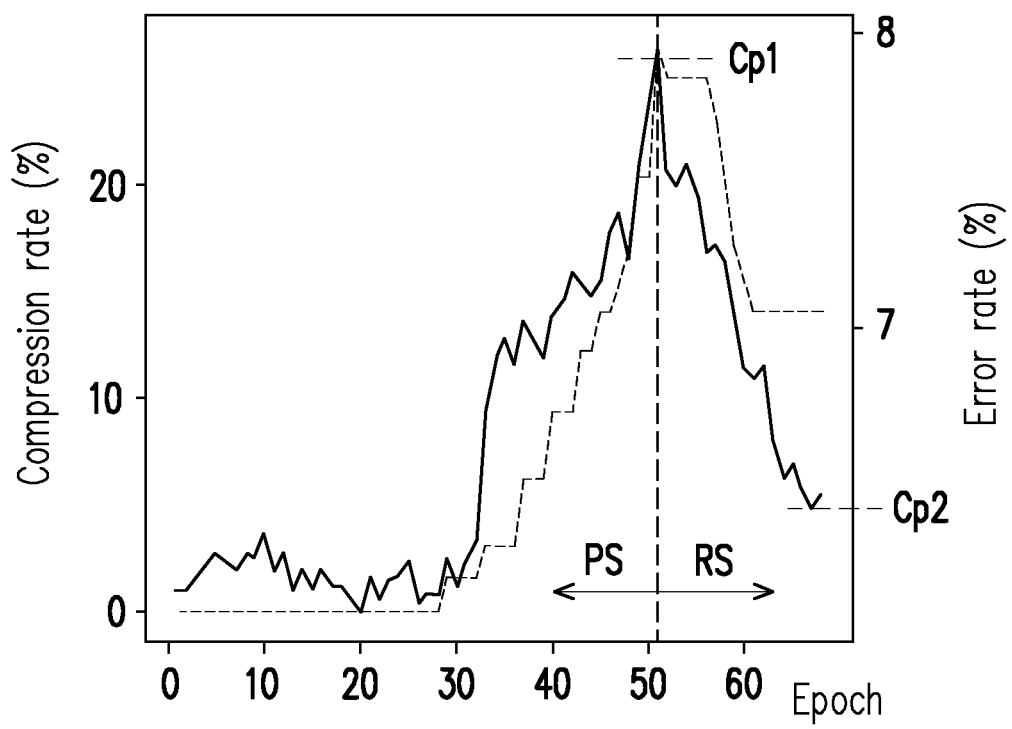
FIG. 5 is a curve diagram illustrating a correlation between a training epoch, a compression rate and an error rate in the compression method for the compressed layer of the artificial neural network according to an embodiment of the invention.

With reference to FIG. 5, FIG. 5 is a curve diagram illustrating a correlation between a training epoch, a compression rate and an error rate in the compression method for the compressed layer of the artificial neural network according to an embodiment of the invention. In FIG. 5, in a compression procedure PS, as the number of deleted channels increases, a compression rate curve SPR and an error rate curve ERR would rise as the number of epochs increases. When the moving average of the training error rate $E_{ema}$ is greater than a threshold $C_{P1}$, the compression rate curve SPR also rises to the maximum value. Based on the fact that the moving average of the training error rate $E_{ema}$ is greater than the threshold $C_{P1}$, a restoring procedure RS may be activated. Through the action of restoring the channels, the compression rate curve SPR and the error rate curve ERR would drop as the number of epochs increases, and the compressed artificial neural network would be generated.

It should be noted that, the restoring procedure RS may be stopped when the moving average of a training error rate drops to be lower than another preset threshold $C_{P2}$ (the error rate curve ERR<the threshold $C_{P2}$).

It should also be noted that, in other embodiments of the invention, when the moving average of a training error rate drops to be lower than the threshold $C_{P2}$ (the error rate curve ERR<the threshold $C_{P2}$), the compression procedure may be re-performed and the compression action may be performed again for the channel. In other words, the compressed artificial neural network may be generated by alternately performing the compression procedure and the restoring procedure multiple times according to the embodiments of the invention.

Figure 6A:
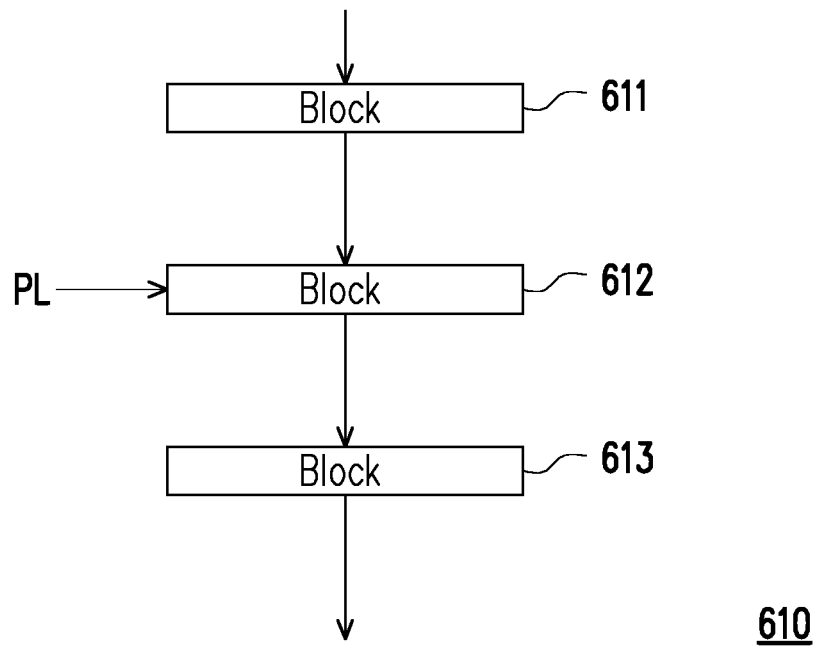
FIG. 6A and FIG. 6B are schematic diagrams respectively illustrating different embodiments of the compression method for the artificial neural network according to the invention.
Figure 6B:
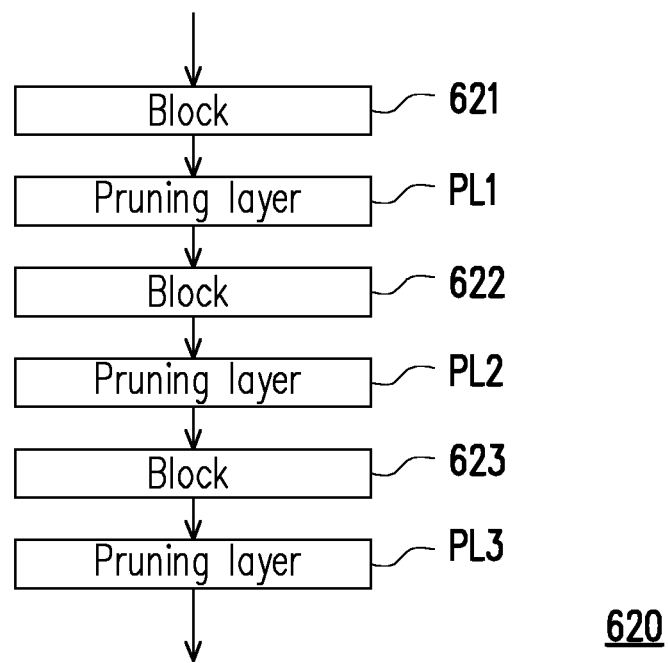

With reference to FIG. 6A and FIG. 6B, FIG. 6A and FIG. 6B are schematic diagrams respectively illustrating different embodiments of the compression method for the artificial neural network according to the invention. In FIG. 6A, an artificial neural network 610 includes a plurality of blocks 611 to 613. A compression method for the artificial neural network 610 may be executed by a "within block" implementation. In this case, when the channel sparsity action is executed for the block 612, a pruning layer PL may be inserted to the block 612, so the objective of channel sparsity action may then be achieved by executing the action of deleting redundant channels. In FIG. 6B, an artificial neural network 620 includes a plurality of blocks 621 to 623. A compression method for the artificial neural network 620 may be executed by a "between block" implementation. In this case, a plurality of pruning layers PL1 to PL3 having the same dimension are respectively inserted between the blocks 611 and 612, between the blocks 612 and 613 and after the block 613. The pruning layers PL1 to PL3 can execute the channel sparsity action for the blocks 611, 612 and 613, respectively.

Figure 7:
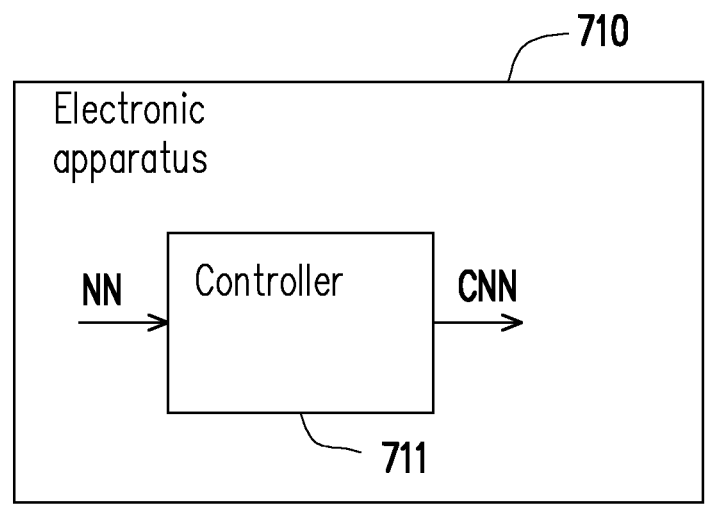
FIG. 7 is a schematic diagram illustrating an electronic apparatus according to an embodiment of the invention.

With reference to FIG. 7, FIG. 7 is a schematic diagram illustrating an electronic apparatus according to an embodiment of the invention. The electronic apparatus 710 includes a controller 711. The controller 711 is configured to receive an artificial neural network NN in order to execute analysis and processing action on, for example, image data. To simplify computational complexity for the electronic apparatus 710, the controller 711 can execute the compression method mentioned in the foregoing embodiments for the artificial neural network NN to reduce the number of channels in one or more convolution layers for the artificial neural network NN, so as to generate a compressed artificial neural network CNN.

Details regarding the compression method to be executed by the controller 711 have been described in the foregoing embodiments, which are not repeated hereinafter.

In this embodiment, the controller 711 may be a processor with computing capability. Alternatively, the controller 711 may be a hardware circuit designed through Hardware Description Language (HDL) or any other design methods for digital circuit well-known to persons with ordinary skill in the art and may be implemented in from of Field Programmable Gate Array (FPGA), Complex Programmable Logic Device (CPLD) or Application-specific Integrated Circuit (ASIC).

In summary, by providing the pruning layer having the weighting values and setting the pruning layer after the Lth convolution layer, the action of deleting the redundancy channels may be performed for the Lth convolution layer in the invention. Then, the compression action may be completed for the Lth convolution layer by the action of deleting the redundancy channel. According to the embodiments of the invention, the compression action may be completed for the artificial neural network by a simple mechanism. As a result, computational complexity may be effectively simplified for the artificial neural network while maintaining precision and performance for the artificial neural network.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A compression method for an artificial neural network, adapted for the artificial neural network with a plurality of convolution layers, the compression method comprising:
setting a first pruning layer for coupling the first pruning layer to a Lth convolution layer among the convolution layers by a controller, wherein the first pruning layer has a plurality of first weighting values, and the first weighting values respectively correspond to a plurality of channels of the Lth convolution layer, wherein L is a positive integer;
tuning the first weighting values, selecting a part of the channels of the Lth convolution layer to be at least one first redundancy channel according to the first weighting values by the controller, and generating a compressed Lth convolution layer by deleting the at least one first redundancy channel by the controller;
removing the first pruning layer, and generating a first compressed artificial neural network by the controller,
wherein a step of tuning the first weighting values comprises:
fixing a plurality of variable values in the artificial neural network by the controller;
setting the first weighting values to be real numbers by the controller, wherein each of the first weighting values is greater than or equal to 0 and less than or equal to 1;
creating a target function according to an error function, and an absolute value of each of the first weighting values, and further according to a difference between 1 and each of the first weighting values and the first weighting values by the controller, wherein the error function is used to calculate a difference between an actual output value and a predicted output value of the Lth convolution layer; and
tuning the first weighting values according to the error function by the controller,
wherein the target function $\mathcal{L}_{all} = \mathcal{L}(Y, Y1) + \lambda_1 \cdot \|P\|_1 + \lambda_2 \cdot \|P \odot (1-P)\|_1$, wherein $\mathcal{L}(Y, Y1)$ is the error function, Y is the actual output value, Y1 is the predicted output value, $\|P\|_1$ is a norm of each of the first weighting values, $\lambda_1$ and $\lambda_2$ are constants, and $\odot$ is a multiplication operator; and
applying the first compressed artificial neural network to execute analysis and processing action on image data by the controller.

2. The compression method according to claim 1, wherein the step of tuning the first weighting values further comprises:
updating the variable values in the artificial neural network;
comparing the first weighting values with a reference value to generate a plurality of comparison results, respectively; and
respectively tuning the first weighting values to be a plurality of binarized first weighting values according to the comparison results.

3. The compression method according to claim 2, wherein each of the binarized first weighting values is 0 or 1.

4. The compression method according to claim 2, wherein the reference value is equal to 0.5.

5. The compression method according to claim 1, further comprising:
calculating a moving average of a training error rate;
comparing the moving average with a first threshold; and
activating a restoring procedure when the moving average is greater than the threshold.

6. The compression method according to claim 5, wherein a part of the at least one first redundancy channel is restored when the restoring procedure is activated.

7. The compression method according to claim 5, wherein the moving average is compared with a second threshold when the restoring procedure is activated, and the restoring procedure is stopped when the moving average is less than the second threshold.

8. The compression method according to claim 1, further comprising:
setting a second pruning layer for coupling the second pruning layer to an (L+1)th convolution layer among the convolution layers, wherein the second pruning layer has a plurality of second weighting values, and the second weighting values respectively correspond to a plurality of channels of the (L+1)th convolution layer;
tuning the second weighting values, selecting a part of the channels of the (L+1)th convolution layer to be at least one second redundancy channel according to the second weighting values, and generating a compressed (L+1)th convolution layer by deleting the at least one second redundancy channel; and
removing the second pruning layer, and generating a second compressed artificial neural network.

9. An electronic apparatus configured to execute an algorithm for an artificial neural network with a plurality of convolution layers, comprising:
a controller, configured for:
setting a first pruning layer for coupling the first pruning layer to a Lth convolution layer among the convolution layers, wherein the first pruning layer has a plurality of first weighting values, and the first weighting values respectively correspond to a plurality of channels of the Lth convolution layer, wherein L is a positive integer;
tuning the first weighting values, selecting a part of the channels of the (L+1)th convolution layer to be at least one first redundancy channel according to the first weighting values, and generating a compressed Lth convolution layer by deleting the at least one first redundancy channel; and
removing the first pruning layer, and generating a first compressed artificial neural network,
wherein the controller tunes the first weighting values by:
fixing a plurality of variable values in the artificial neural network;
setting the first weighting values to be real numbers, wherein each of the first weighting values is greater than or equal to 0 and less than or equal to 1;
creating a target function according to an error function, and an absolute value of each of the first weighting values, and further according to a difference between 1 and each of the first weighting values and the first weighting values, wherein the error function is used to calculate a difference between an actual output value and a predicted output value of the Lth convolution layer; and tuning the first weighting values according to the error function, wherein the target function $\mathcal{L}_{all}=\mathcal{L}(Y,Y1)+\lambda_1\cdot\|P\|_1+\lambda_2\cdot\|P\odot(1-P)\|_1$, wherein $\mathcal{L}(Y,Y1)$ is the error function, Y is the actual output value, Y1 is the predicted output value, $\|P\|_1$ is a norm of each of the first weighting values, $\lambda_1$ and $\lambda_2$ are constants, and $\odot$ is a multiplication operator;

where the controller further applies the first compressed artificial neural network to execute analysis and processing action on image data.

* * * * *